US006771692B2

(12) United States Patent
Rick et al.

(10) Patent No.: US 6,771,692 B2
(45) Date of Patent: Aug. 3, 2004

(54) TIME TRACKING IN A NON-NEGLIGIBLE MULTIPATH SPACING ENVIRONMENT

(75) Inventors: Roland Reinhard Rick, San Diego, CA (US); Parvathanathan Subrahmanya, Sunnyvale, CA (US); Brian K. Butler, La Jolla, CA (US); Shimman Patel, San Diego, CA (US); Thunyachate Ekvetchavit, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 14 days.

(21) Appl. No.: 09/964,589

(22) Filed: Sep. 25, 2001

(65) Prior Publication Data

US 2002/0126746 A1 Sep. 12, 2002

Related U.S. Application Data

(60) Provisional application No. 60/261,402, filed on Jan. 11, 2001.

(51) Int. Cl.$^7$ .............................................. H04B 1/707
(52) U.S. Cl. ...................................................... 375/148
(58) Field of Search ................................ 375/137, 144, 375/147, 148, 267, 347, 349

(56) References Cited

U.S. PATENT DOCUMENTS

| | | | | |
|---|---|---|---|---|
| 5,764,687 A | * | 6/1998 | Easton | 375/147 |
| 6,269,075 B1 | * | 7/2001 | Tran | 370/206 |
| 6,345,078 B1 | * | 2/2002 | Basso | 375/349 |
| 2003/0128745 A1 | * | 7/2003 | Sourour et al. | 375/147 |

FOREIGN PATENT DOCUMENTS

WO            0024133        4/2000

OTHER PUBLICATIONS

Weerackody V, "Diversity for the direct–sequence spread spectrum system using multiple transmit antennas" ICC, Geneva, (1993) vol. 3:23, pp. 1775–1779.

\* cited by examiner

*Primary Examiner*—Kevin M. Burd
(74) *Attorney, Agent, or Firm*—Philip R. Wadsworth; Charles D. Brown; George C. Pappas (57) ABSTRACT

In an antenna diversity environment, the timing offset of the receiver's fingers are based on the timing offset of the received peaks of the base station transmit signals. In a system with non-negligible multipath spacing, the timing offset of the received peaks of the base station transmit signals are not necessarily at the same location. In one embodiment, the demodulating elements for the signal from each base station antenna use the same offset for demodulating and determining an error signal based on pilot signal sampling prior to the timing offset and subsequent to the timing offset. The error signals are averaged and used by a time tracking loop to track the incoming signal. In another embodiment, the demodulating elements for the signal from each base station antenna independently time track the signals with different timing offsets for each finger. The preferred embodiment depends on the method used by the base station to multiplex the data onto multiple transmit antennas.

21 Claims, 7 Drawing Sheets

| | | | | | | | | | |
|---|---|---|---|---|---|---|---|---|---|
| DIVERSITY | A | -A | -A | A | -A | -A | A | A | ... |
| PRIMARY | A | A | A | A | A | A | A | A | ... |
| SYMBOL NUMBER | 0 | 1 | 2 | 3 | 4 | 5 | 6 | 7 | ... |

FIG. 8

TIME TRACKING IN A NON-NEGLIGIBLE MULTIPATH SPACING ENVIRONMENT

RELATED APPLICATIONS

This application claims priority to U.S. Provisional Application No. 60/261,402, filed Jan. 11, 2001.

BACKGROUND OF THE INVENTION

1. Field of the Invention

The present invention relates generally to Code Division Multiple Access communications. Particularly, the present invention relates to time tracking received signals in a non-negligible multipath spacing environment.

2. Description of the Related Art

Code Division Multiple Access (CDMA) communications systems use base stations coupled to directional antennas that are typically located in the center of a cell and broadcast into sectors of the cell. The cells are located in major metropolitan areas, along highways, and along train tracks to allow consumers to communicate both at home and while traveling.

Figure 1:
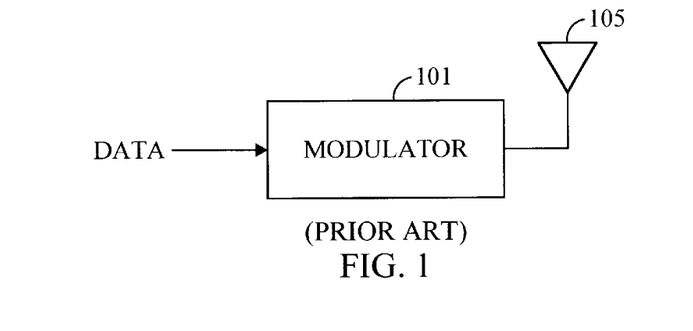
FIG. 1 shows block diagram of a typical prior art base station with a single antenna.

FIG. 1 illustrates a block diagram of a typical CDMA base station. The user data is input to a modulator (101) that performs the CDMA modulation prior to transmission on the single antenna (105). The CDMA modulation technique is well known in the art.

The base station transmits a pilot channel that is received by a mobile station. The pilot channel, comprised of symbols, contains no information. The mobile station uses the pilot channel as a reference signal for time, frequency, phase, and signal strength.

Mobile stations are comprised of RAKE receivers. A conventional RAKE receiver operates on received signals with correlators known as "fingers". Using the knowledge of complex channel coefficients of each desired multipath component, the RAKE receiver coherently combines finger outputs.

Figure 2:
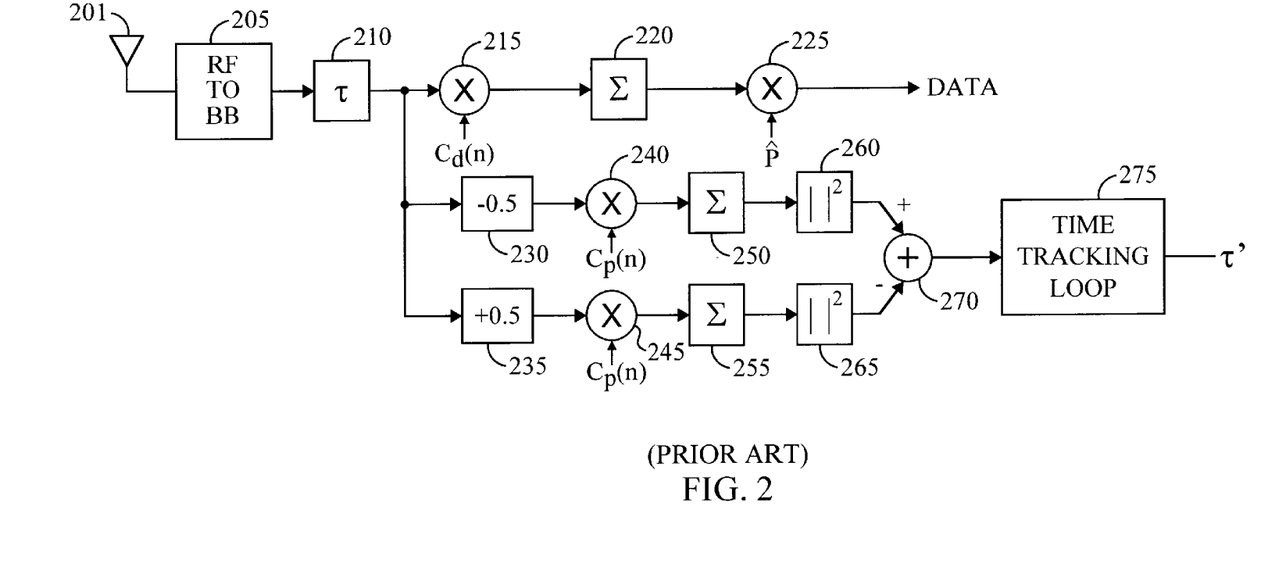
FIG. 2 shows block diagram of a typical prior art mobile station receiver with a single receiving path.

A block diagram of a typical RAKE receiver is illustrated in FIG. 2. For purposes of clarity, only one finger of the receiver is shown. The receiver is comprised of an antenna (201) that receives the signal for conversion from the received radio frequency-to-baseband frequency (205). The base band data is a digital data stream.

An initial time delay, $\tau$, is chosen (210) and the digital data stream is despread by multiplying (215) it with the original spreading sequence combined with a Walsh code. This is referred to as $c_d(n)$.

The despread signal is correlated by summing (220) it over a symbol time (64 chips). The complex signal output from the correlator is multiplied (225) with an estimate of the pilot signal, $\hat{P}$, in order to rotate the phase of the input signal. This step outputs the demodulated data.

In parallel with the demodulation at time $\tau$, the digital data stream is also demodulated half a chip prior to $\tau$ and half a chip after $\tau$ in order to generate a more accurate $\tau$. It would be best to sample the waveform at the peak during the on-time sample. However, since this cannot always be accomplished, an early sample is taken approximately half a chip time before the on-time sample and a late sample is taken approximately half a chip time after the on-time sample.

After the ±0.5 chip delay blocks (230 and 235), the delayed digital data streams are multiplied (240 and 245) with a combination of the same spreading sequence used in the demodulation path and the pilot Walsh code. This is referred to as $c_p(n)$. These signals are correlated (250 and 255) and the magnitude of each signal is then squared (260 and 265).

The squared magnitudes are subtracted (270) to find the difference between the two energies. If the difference is zero, the initial estimate for $\tau$ was accurate. If the difference is other than zero, this error is input to a time tracking loop (275) to generate a new estimate $\tau$. Each finger tracks its assigned signal path using the time tracking loop (275) by controlling the finger's location with respect to time.

The above-described receiver performs adequate time tracking if the single base station antenna of FIG. 1 is used. However, if the base station uses antenna diversity, as illustrated in FIG. 3, time tracking becomes more complex in a non-negligible multipath spacing environment.

Figure 3:
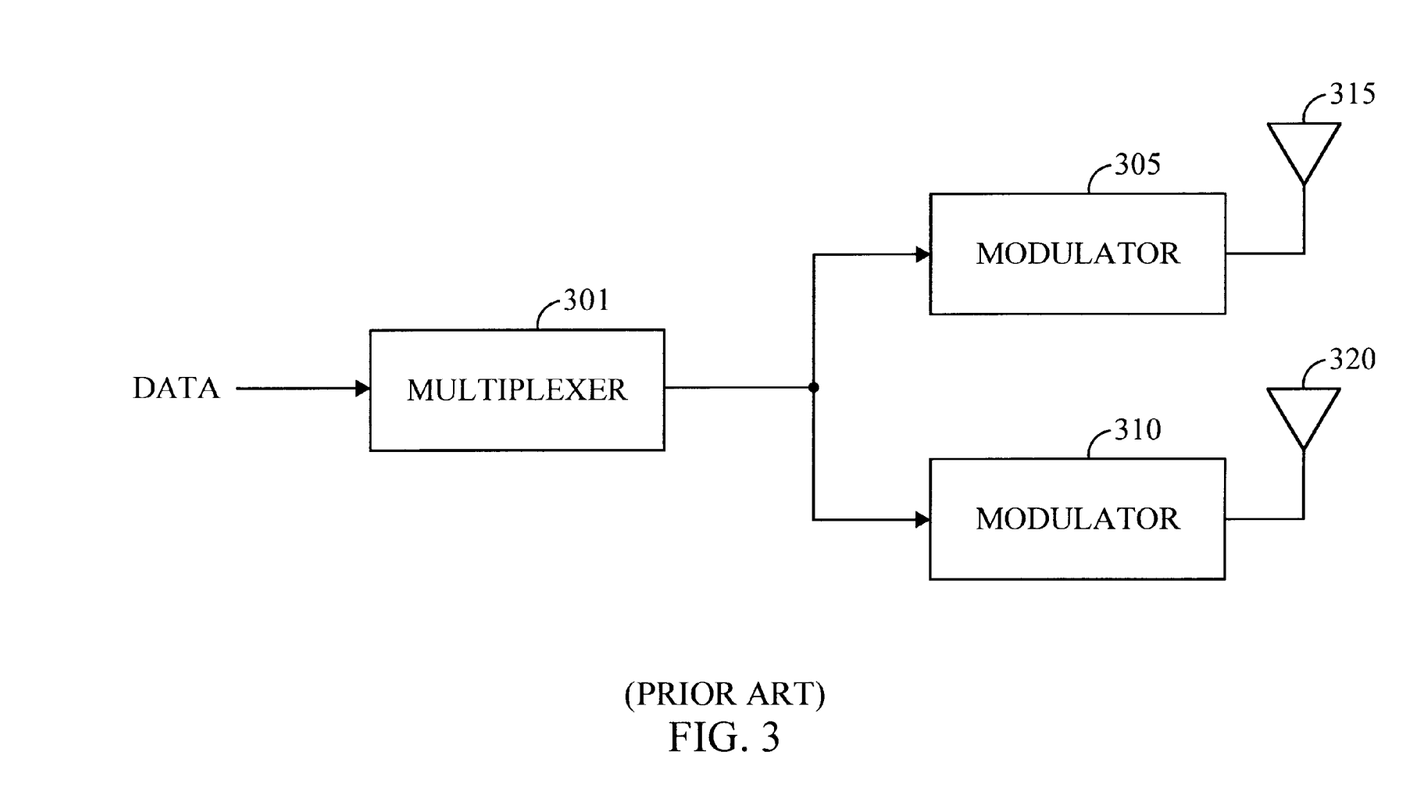
FIG. 3 shows a block diagram of a typical base station with antenna diversity.

FIG. 3 illustrates a typical prior art base station where the main data signal is input to a multiplexer (301) before being modulated (305 and 310). The multiplexer (301) switches the data between two or more modulation paths (305 and 310). Each modulation path (305 and 310) is coupled to a separate antenna (315 and 320).

The antennas are typically geographically separated such that the received signal at the mobile station has approximately the same time delay with independent fading characteristics. The most common methods for multiplexing data at the base station are Orthogonal Transmit Diversity and Space Time Spreading.

The Orthogonal Transmit Diversity scheme alternates the transmitted data between the transmit antennas such that each antenna is transmitting a different data signal that is a subset of the main data signal. For example, a first symbol of the main data signal is transmitted on the first antenna, a second symbol is transmitted on the second antenna, and a third symbol is transmitted on the first antenna. In this manner, if the mobile station loses data from one of the antennas, it only loses every other symbol and an error correction routine can correct for the loss.

The Space Time Spreading scheme transmits some information about each data symbol on both antennas. This scheme assumes that the mobile station will be in contact with at least one of the antennas at all times and, therefore, will continue to receive uninterrupted data.

A problem occurs when a mobile station's receiver has to time track on the signals from both base station transmit antennas, and the multipath spacing from one or both of these antennas is non-negligible (e.g., multipath spacing is less than 1.5 chips). There is a resulting need for a receiver that can time track in a non-negligible multi-path environment having antenna diversity.

SUMMARY OF THE INVENTION

The present invention encompasses a method for offset time tracking in a non-negligible multipath spacing environment in which an antenna diversity system is operating. The antenna diversity system comprises a plurality of antennas that each transmits a signal to a mobile station. In one embodiment, the transmitted signals are different functions of the same data. In an alternate embodiment, the transmitted signals are alternating portions of a main signal.

The time tracking is accomplished by generating updated time offsets in response to an average time error signal or by allowing the demodulating elements to independently time track the signals from each antenna. The embodiment used depends on whether the diversity antennas are transmitting using Space Time Spreading or Orthogonal Transmit Diversity.

In one embodiment, the method demodulates, based on one offset, each of the plurality of signals received from the base station's diversity antennas. A time error signal is then calculated from each of the demodulated signal's pilot signals that are sampled prior to the offset and subsequent to the offset. Based on the time error signals, an average time error signal is generated. An updated time offset is then calculated with a time tracking loop in response to the average time error signal.

In another embodiment, the received signals are demodulated using a different offset for each received signal. In this case, each of the receiver's demodulating elements independently track the received signals with two separate time tracking loops.

DETAILED DESCRIPTION OF THE PREFERRED EMBODIMENT

Figure 4:
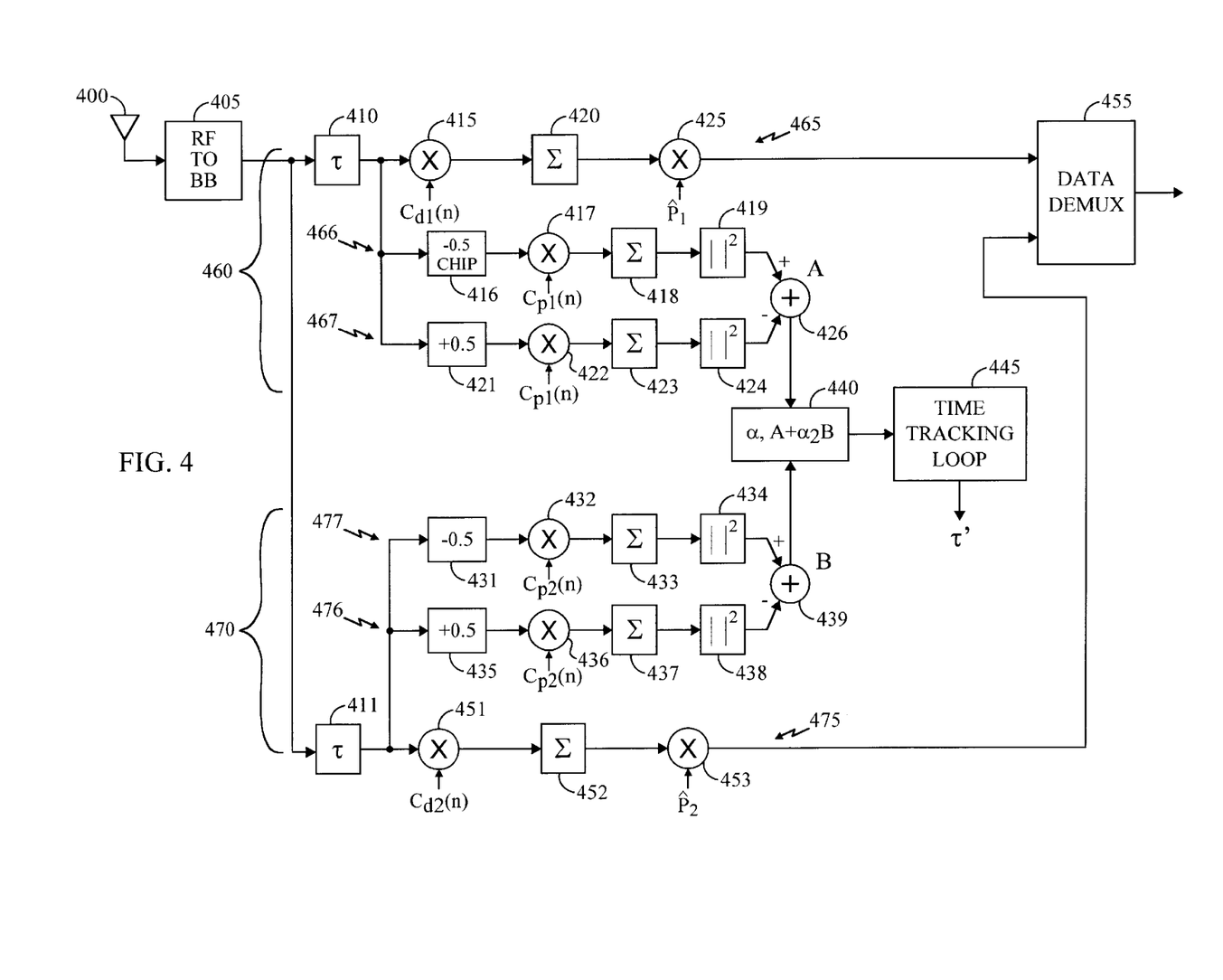
FIG. 4 shows a block diagram of the preferred embodiment receiver of the present invention

The present invention provides a mobile station with the ability to time track received signals in an area where the base stations transmit using antenna diversity. This is accomplished by either choosing the timing offset of the RAKE receiver fingers based on an average timing error or allowing the demodulating elements of the receiver to independently time track the signals from each antenna FIG. 4 illustrates a block diagram of a receiver of the present invention. This embodiment works best in a Space Time Spreading environment since it uses the same estimate for $\tau$ in all the fingers. While the transmitted signals are substantially similar, they are different in that different spreading sequences are used on the data during the modulation process in order to keep the signals from interfering with each other during transmission.

For purposes of clarity, the receiver of FIG. 4 is subsequently described with only two fingers. Alternate embodiments use other quantities of fingers.

Referring to FIG. 4, the receiver is comprised of an antenna (400) that receives the transmitted signals from the multiple base station antennas. A radio frequency-to-baseband conversion (405) is performed to generate a digital data stream.

The digital data stream is input to two fingers (460 and 470). Each finger is comprised of a demodulation path (465 and 475) in which the digital data stream from the radio frequency-to-baseband converter (405) is demodulated at the same time offset, $\tau$ (410 and 411).

The first finger's $\tau$ offset demodulation path (465) is comprised of a despreader (415) that multiplies the digital data stream with a data despreading sequence comprised of the original data spreading sequence and a Walsh code. This sequence is referred to as $c_{d1}(n)$.

The despread signal is then correlated by summing (420) it over a symbol time (64 chips). The complex signal output from the correlator (420) is multiplied (425) with an estimate of the pilot signal, $\hat{P}_1$, in order to rotate the phase of the complex input signal. This step produces the demodulated data at offset $\tau$.

In parallel with the demodulation at offset time $\tau$, the digital data stream is also demodulated at offsets ($\tau$−0.5) (466) and ($\tau$+0.5) (467) in order to generate a more accurate $\tau$ from the pilot signal associated with the digital data stream. The early (466) and late (467) samples are performed in order to generate an error signal that is used to track $\tau$.

The ±0.5 chip delay blocks (416 and 421) generate signals that can be expressed as $x(n)$ and $z(n)$, respectively, where n represents the time index. These digital data streams are multiplied (417 and 422) with a combination of the original spreading sequence and the pilot Walsh code (e.g., $c_{p1}(n)$). The despread signals are then correlated (418 and 423) to generate the expressions sum($x(n) * c_{p1}(n)$) and sum($z(n) *c_{p1}(n)$). The duration of the sum is chosen such that $c_{p1}$ is orthogonal over the duration of the sum. The magnitude of each signal is then squared (419 and 424).

The squared magnitudes are subtracted (426) to find a time error signal, A, between the two energies. If the difference is zero, the initial estimate for $\tau$ was accurate. If the difference is other than zero, error signal A is used to generate a new $\tau$ estimate $\tau$ described subsequently.

The second finger's $\tau$ offset demodulation path (475) is comprised of a despreader (451) that multiplies the digital data stream with a data despreading sequence comprised of the original data spreading sequence and a Walsh code. This sequence is referred to as $c_{d2}(n)$.

The despread signal is then correlated by summing (452) it over a symbol time (64 chips). The complex signal output from the correlator (452) is multiplied (453) with an estimate of the pilot signal, $\hat{P}_2$, in order to rotate the phase of the complex input signal. The output of this step produces the demodulated data at the same offset $\tau$ as the first finger (460).

In parallel with the demodulation at offset time $\tau$, the digital data stream is also demodulated at offsets ($\tau$−0.5) (477) and ($\tau$+0.5) (476) in order to generate a more accurate $\tau$. The early (477) and late (476) samples are performed in order to generate an error signal that is used to track $\tau$.

The ±0.5 chip delay blocks (431 and 435) generate the same signals as the first finger (460) discussed above. These signals are $x(n)$ and $z(n)$ respectively. These delayed digital data streams are multiplied (432 and 436) with a combination of the original spreading sequence and the pilot Walsh code (e.g., $c_{p2}(n)$). The despread signals are correlated (433 and 437) to generate the expressions sum($x(n)*c_{p2}(n)$) and sum($z(n)*cp_2(n)$). The duration of the sum is chosen such that $c_{p2}$ is orthogonal over the duration of the sum. The magnitude of each signal is then squared (434 and 438).

The squared magnitudes are subtracted (439) to find the difference, B, between the two energies. If the difference is zero, the initial estimate for $\tau$ was accurate. If the difference is other than zero, error signal B is used to generate a new $\tau$ estimate.

Error signal A from the first finger (460) and error signal B from the second finger (470) are used to generate an average error signal by finding a weighted sum. This is accomplished by weighting each error signal depending on their respective energy levels and then summing the weighted errors (440).

As an example, error signal A is weighted by $\alpha_1$ and error signal B is weighted by $\alpha_2$. If the received energies of the pilot signals from each antenna are equal, the preferred values of $\alpha_1$ and $\alpha_2$ are both ½. If the energy of one pilot signal is less than the other, the error signal with the lowest energy value is weighted with a smaller value. In one embodiment, if the energy of the path tracked by the first finger is less than the energy of the path tracked by the second finger, $\alpha_1$ will be set less than $\alpha_2$ so that the tracking shifts more towards the offset determined by the second finger.

The averaged error (440) is input to a time tracking loop (445). The time tracking loop (445) generates a new offset, $\tau'$, that is used for subsequent demodulation of the data and tracking of the pilot signal.

The outputs of the demodulation paths (465 and 475) performed at offset $\tau$ are input to a data demultiplexer (455). The data multiplexer (455) recombines the signal from the two demodulation paths into an estimate of the original data stream.

In the above-described embodiment, $c_{d1}(n)$ and $c_{d2}(n)$ are different data despreading sequences. Since the base station had to cover the data with different sequences prior to transmission in order to keep the signals from interfering, the fingers of the receiver have to use these different sequences in order to decode the data. For substantially similar reasons, the pilot despreading sequences $c_{p1}(n)$ and $c_{p2}(n)$ are also dissimilar.

Figure 5:
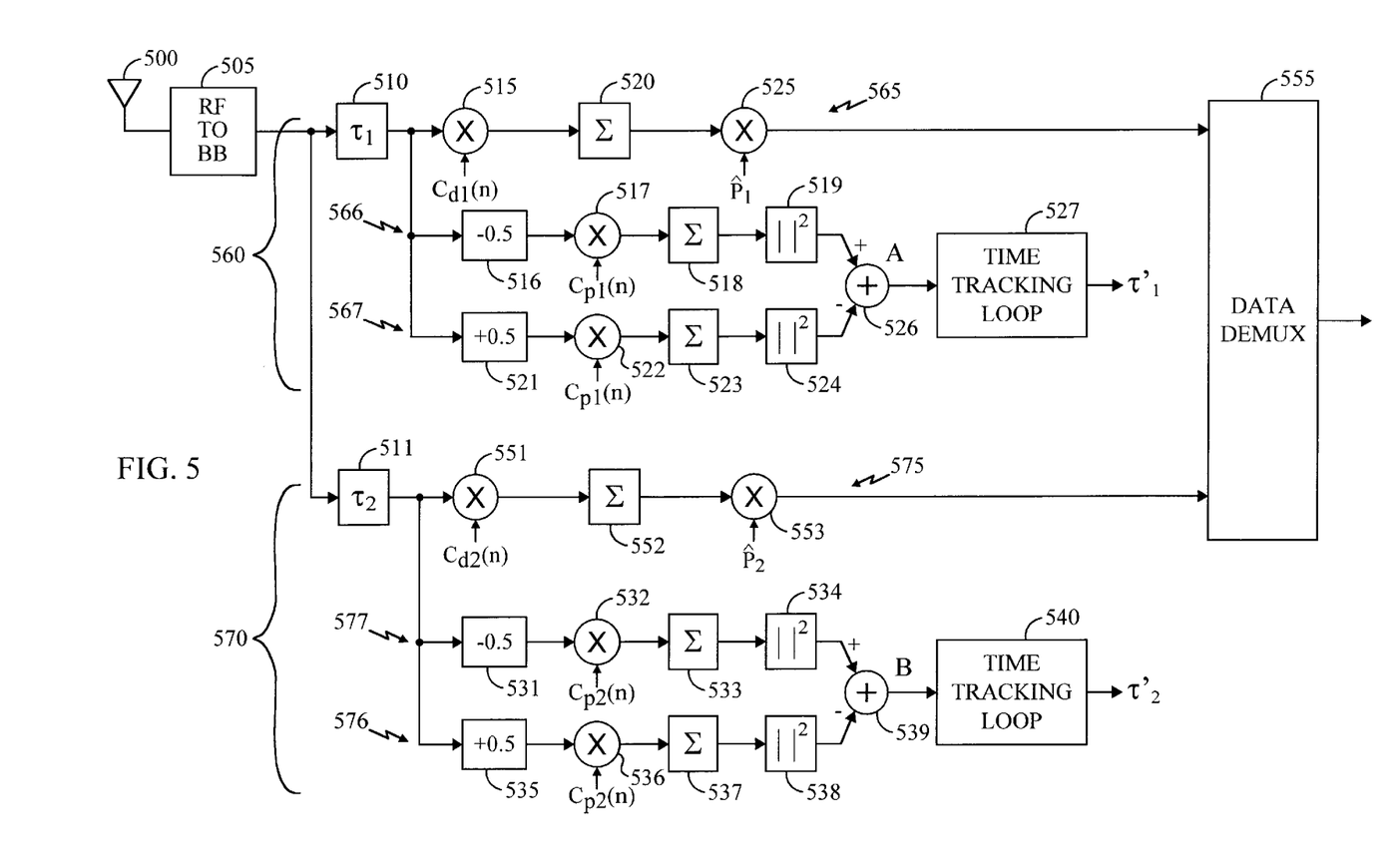
FIG. 5 shows a block diagram of an alternate embodiment receiver of the present invention.

FIG. 5 illustrates a block diagram of a receiver in which the fingers time track the paths independently. This embodiment works best in an environment where each of the base station's antennas are transmitting alternating portions of a data signal as is done in an Orthogonal Transmit Diversity system.

Referring to FIG. 5, the receiver is comprised of an antenna (500) that receives the transmitted signals from the multiple base station antennas. A radio frequency-to-baseband conversion (505) is performed to generate a digital data stream.

The digital data stream is input to two fingers (560 and 570). Each finger is comprised of a demodulation path (565 and 575) in which the digital data stream from the radio frequency-to-baseband converter (505) is demodulated to a useable data signal. Since each finger (560 and 570) is allowed to independently time track its assigned signal path, the initial offsets are chosen as $\tau_1$ for the first finger (560) and $\tau_2$ for the second finger (570).

The first finger's $\tau_1$ offset (510) demodulation path (565) is comprised of a despreader (515) that multiplies the digital data stream with a data despreading sequence comprised of the original data spreading sequence and a Walsh code. This sequence is referred to as $c_{d1}(n)$.

The despread signal is then correlated by summing (520) it over a symbol time. The complex signal output from the correlator (520) is multiplied (525) with an estimate of the pilot signal, $\hat{P}_1$, in order to rotate the phase of the complex input signal. This step produces the demodulated data at offset $\tau_1$.

In parallel with the demodulation at offset time $\tau_1$, the digital data stream is also demodulated at offsets ($\tau_1-0.5$) (566) and ($\tau_1+0.5$) (567) in order to generate a more accurate $\tau$ from the pilot signal associated with the digital data stream. The early (566) and late (567) samples are performed in order to generate an error signal that is used to track $\tau_1$.

After the ±0.5 chip delay blocks (516 and 521), the delayed digital data streams are multiplied (517 and 522) with a combination of the original spreading sequence and the pilot Walsh code. This is referred to as $c_{p1}(n)$. The despread signals are correlated (518 and 523) and the magnitude of each signal is then squared (519 and 524).

The squared energy magnitudes are subtracted (526) to find the difference, A, between the two energies. If the difference is zero, the initial estimate for $\tau_1$ was accurate. If the difference is other than zero, error signal A is used to generate a new $\tau_1$ estimate $\tau'_1$.

Error signal A is input to a time tracking loop (527) that performs a closed loop tracking process that is well known in the art and not discussed further. The output of the time tracking loop (527) is the new estimate for $\tau_1$, $\tau'_1$.

The second finger's $\tau_2$ offset (511) demodulation path (575) is comprised of a despreader (551) that multiplies the digital data stream with a data despreading sequence comprised of the original data spreading sequence and a Walsh code. This sequence is referred to as $c_{d2}(n)$.

The despread signal is then correlated by summing (552) it over a symbol time. The complex signal output from the correlator (552) is multiplied (553) with an estimate of the pilot signal, $\hat{P}_2$, in order to rotate the phase of the complex input signal. The output of this step produces the demodulated data at an offset of $\tau_2$.

In parallel with the demodulation at offset time $\tau_2$, the digital data stream is also demodulated at offsets ($\tau_2-0.5$) (577) and ($\tau_2+0.5$) (576) in order to generate a more accurate $\tau$ from the pilot signal. The early (577) and late (576) samples are performed in order to generate an error signal that is used to track $\tau_2$.

After the ±0.5 chip delay blocks (531 and 535), the delayed digital data streams are multiplied (532 and 536) with a combination of the original spreading sequence and the pilot Walsh code. This is referred to as $c_{p2}(n)$. The despread signals are correlated (533 and 537) and the magnitude of each signal is then squared (534 and 538).

The squared magnitudes are subtracted (539) to find the difference, B, between the two energies. If the difference is zero, the initial estimate for $\tau_2$ was accurate. If the difference is other than zero, error signal B is used to generate a new $\tau_2$ estimate.

Error signal B is input to a time tracking loop (540) that performs a closed loop tracking process that is well known in the art and not discussed further. The output of the time tracking loop (540) is the new estimate for $\tau_2$, $\tau'_2$.

The outputs of the demodulation paths (565 and 575) of each finger (560 and 570) are input to a data demultiplexer (555). Since the data was transmitted in an alternate fashion from the diversity antennas, the demultiplexer (555) alternates between each demodulation path (565 and 575) in order to reconstruct the transmitted data. If the data was transmitted such that every other symbol was transmitted from a different antenna, then the demultiplexer (555) alternates between the demodulation paths (565 and 575) every other symbol. The output of the data demultiplexer is the reconstructed user data.

In the above-described embodiment of FIG. 5, $c_{d1}(n)$ and $c_{d2}(n)$ are different data despreading sequences and the pilot despreading sequences, $c_{p1}(n)$ and $c_{p2}(n)$, are also dissimilar.

The reason for this is described above with reference to the embodiment of FIG. 4.

Figure 6:
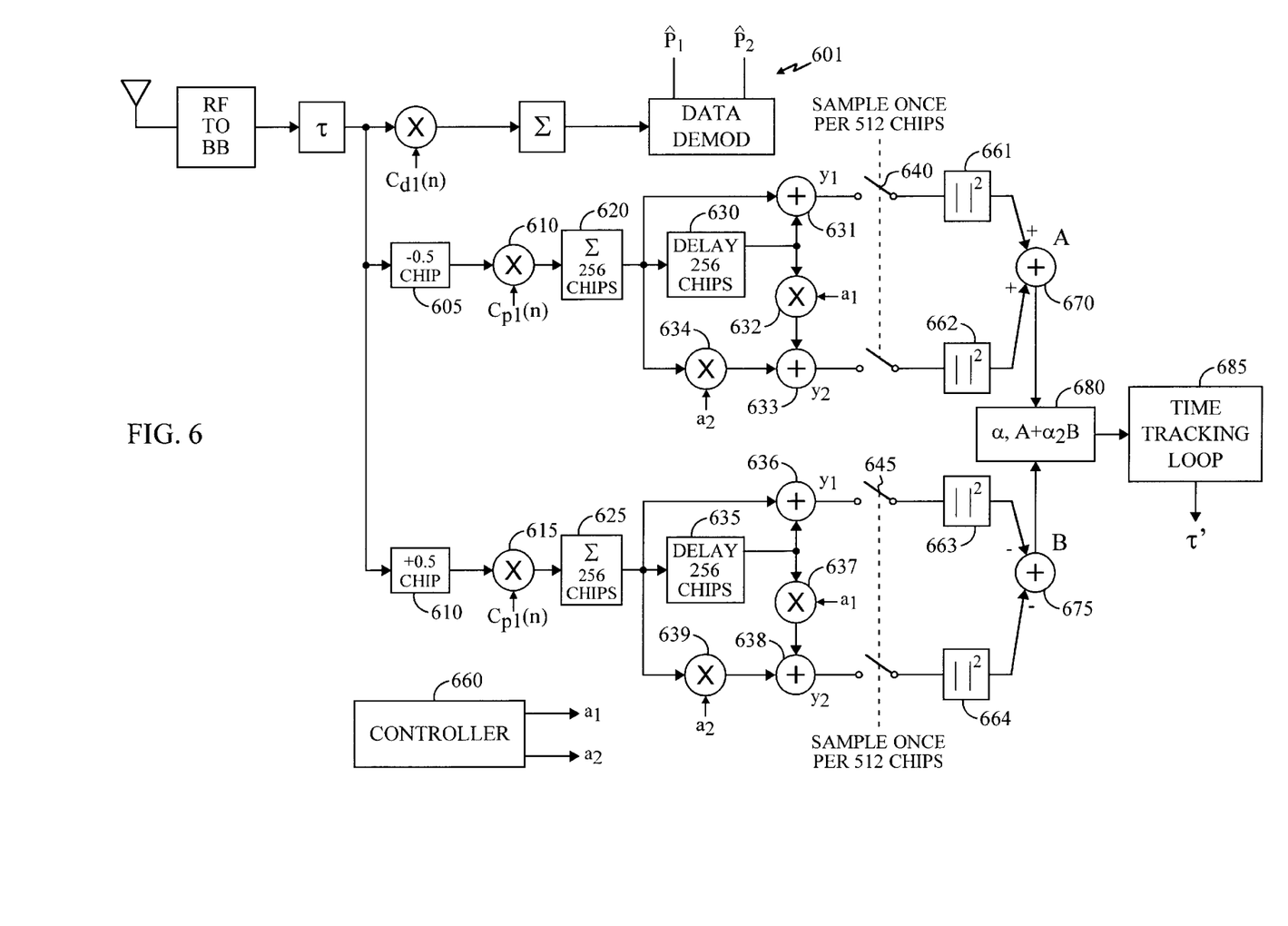
FIG. 6 shows a block diagram of another alternate embodiment receiver of the present invention.

FIG. 6 illustrates a block diagram of another alternate embodiment receiver of the present invention. This receiver, in one implementation, may be used in a wide band CDMA (WCDMA) environment. The WCDMA standard is well known in the art and is not discussed further. The receiver illustrated in FIG. 6 may also be used in other multiple access environments requiring the time tracking provided by the present invention.

While the embodiment of FIG. 4 has been illustrated with two fingers, the embodiment of FIG. 6 shares some of the hardware and firmware, such as the despreaders, rotators, and accumulators, between the two fingers. It can be seen that blocks 416 and 431 of the two fingers (460 and 470) carry the same signal x(n). Additionally, blocks 421 and 435 carry the same signal z(n). The only difference between the two fingers is the pilot Walsh code used in despreading the signals.

In the WCDMA standard, $c_{p1}$ and $c_{p2}$ have a special relationship over the correlation duration of 512 chips. This relationship is expressed as:

$$c_{p2}(n) = c_{p1}(n) \text{ for } n=0 \text{ to } 255; \text{ and}$$

$$c_{p2}(n) = -c_{p1}(n) \text{ for } n=256 \text{ to } 511.$$

In order to generate the sums illustrated in the discussion of FIG. 4, a single adder may be used that accumulates over consecutive 256-chip intervals. This adder would form the following sums:

$$\text{sum1} = \text{sum}(x(n) * c_{p1}(n)) \text{ for } n=0 \text{ to } 255; \text{ and}$$

$$\text{sum2} = \text{sum}(x(n) * c_{p1}(n)) \text{ for } n=256 \text{ to } 511.$$

The embodiment of FIG. 6 implements this reduced hardware version of FIG. 4. Referring to FIG. 6, the receiver is comprised of a demodulation path (601) in which the digital data stream from the radio frequency-to-baseband converter is demodulated at the same time offset, τ. The demodulation path (601) of FIG. 6 is substantially similar to the demodulation path (465) illustrated in FIG. 4. Therefore, refer to the above discussion for the operation of the demodulation path (601) of FIG. 6.

In parallel with the demodulation at offset time τ, the receiver of FIG. 6 demodulates the digital data stream at offsets (τ−0.5) (605) and (τ+0.5) (610) in order to generate a more accurate τ from the pilot signal associated with the digital data stream. The early (605) and late (610) samples are performed in order to generate an error signal that is used to track τ.

The early (605) and late (610) signals are then despread with the Walsh code $c_{p1}(n)$ (610 and 615). These signals are then accumulated (620 and 625) over a 256-chip interval in order to generate an output of one symbol from each summer (620 and 625).

The symbols are then input to delay blocks (630 and 635) that enable the symbols to be alternately added or subtracted from themselves, depending on the state of the control signals $a_1$ and $a_2$. Control signals $a_1$ and $a_2$ are generated by the mobile station's controller (660) that is described subsequently in reference to FIG. 7. The process the controller (660) uses to determine the state of the control signals depends on the pilot structure and symbol number as illustrated in FIG. 8.

Figure 8:
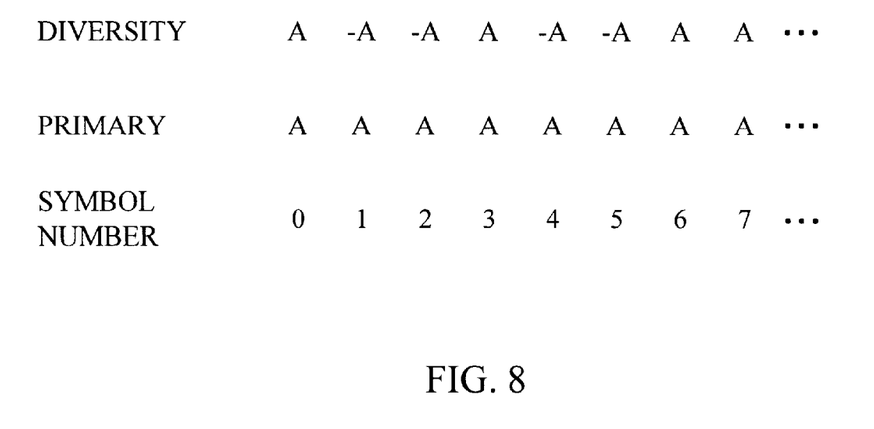
FIG. 8 shows a table of the pilot structure of WCDMA with corresponding symbol numbers.

FIG. 8 shows a table of the pilot structure of WCDMA as is well known in the art. The top line of the table is the pilot structure as transmitted from a diversity antenna while the second line is the pilot structure as transmitted from the primary antenna. The symbol number corresponds to a particular group of pilot symbols, (A, A) or (−A, A).

Using the symbol numbers of FIG. 8, the controller (660) generates the control signals $a_1$ and $a_2$ as follows:

| Symbol No. | $a_1$ | $a_2$ |
|---|---|---|
| 0 & 1 | 1 | −1 |
| 2 & 3 | −1 | 1 |
| 4 & 5 | 1 | −1 |
| 6 & 7 | −1 | 1 |

Referring again to FIG. 6, the above control signals are used in generating the $y_1$ and $y_2$ sums by multiplying (632, 634, 637, and 639) either the symbol or the delayed symbol by "1" or "−1" before summing (631, 633, 636, and 638). As an example, during symbol "0" $y_1$=sum1+sum2, where sum1 and sum2 are illustrated above. Also during symbol "0", $y_2$=sum1−sum2.

The signals $y_1$ and $y_2$ are then sampled at 512-chip intervals (640 and 645). This sampling recovers the original symbol.

The magnitude of the recovered symbols are then squared (661–664) before the early $y_1$ and $y_2$ signals are summed (670) in order to generate the A signal. The negatives of the late $y_1$ and $y_2$ signals are summed (675) in order to generate the B signal. As in the embodiment of; FIG. 4, the A and B signals are input to a weighted average block (680). The output of the weighted average (680) is then input to the time tracking loop (685) in order to generate the updated τ, τ'.

While the above-described methods and apparatuses of the present invention use delays of ±0.5 chip time and weighting of error signals to obtain a measure of timing error, alternate embodiments use other processes to obtain a measure of the timing error. Additionally, alternate embodiments may be used to allow the demodulating elements to independently time track the signals from each antenna.

Figure 7:
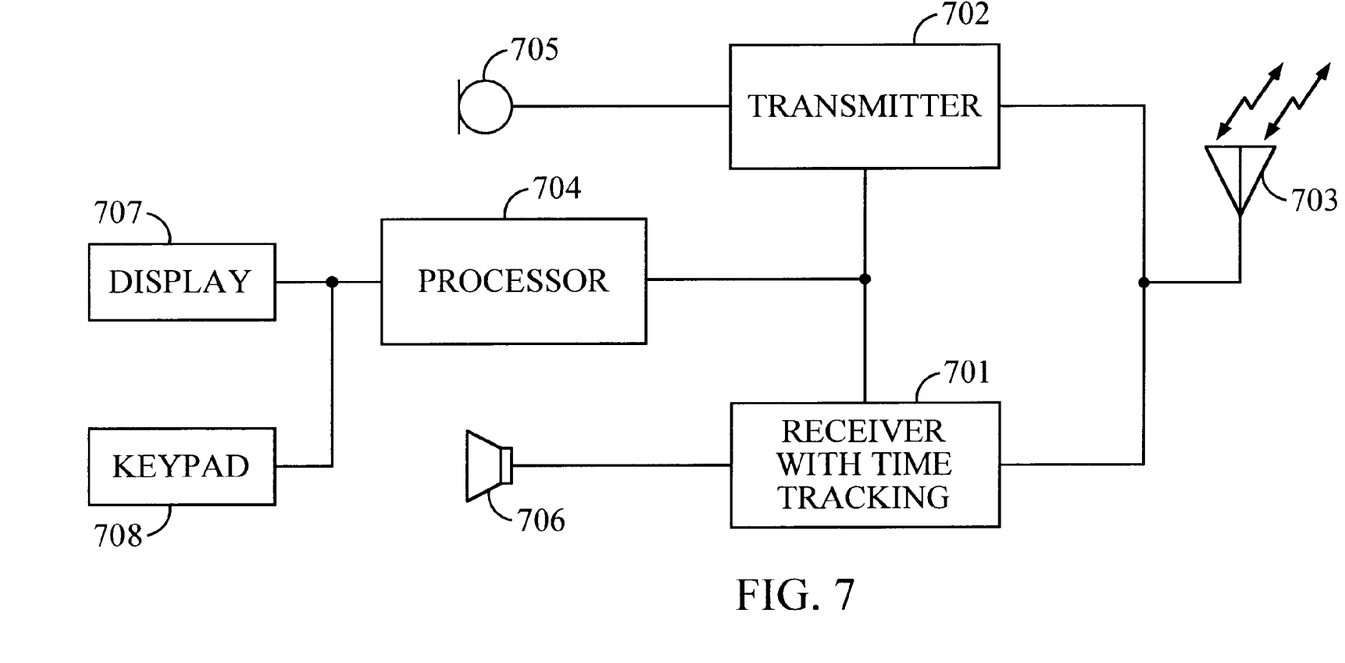
FIG. 7 shows a block diagram of a mobile station in accordance with the present invention.

FIG. 7 illustrates a block diagram of a mobile station incorporating the time tracking processes and apparatuses of the present invention. The mobile station is comprised of a transmitter (702) and receiver (701) that are coupled to an antenna (703). The transmitter modulates the aural signals from a microphone (705) for transmission. In some cases, depending on the type of communication device, the transmitter (702) or other device may digitize the aural signal from the microphone (705) as part of the modulation process. The antenna (703) then radiates the signal to a base station.

The receiver (701) is comprised of the time tracking processes and apparatuses described above. The receiver is responsible for receiving, tracking, and demodulating signals received over the antenna (703). In some communication devices, the receiver may be responsible for converting received digital signals into their analog equivalent for radiation by the speaker (706).

The communication device is controlled by a processor (704) such as a microprocessor or other controlling device. The processor is coupled to and controls the transmitter (702) arid receiver (701) functions. For example, the processor may be used to monitor the fingers for proper tracking and to execute the searcher and finger assignment algorithms.

A display (707) and keypad (708) are coupled to the process (704) for displaying information entered by a user on the keypad (708). For example, the user may enter a telephone number using the keypad (708) that is displayed on the display (707) and subsequently transmitted to a base station using the transmitter (702).

In the preferred embodiment, the communication device is a CDMA cellular radiotelephone incorporating the time tracking of the present invention. Alternate embodiments include personal digital assistants with communication capabilities and computers with communication capabilities.

As discussed above, the embodiment of FIG. 4 works best in a Space Time Spreading system and the embodiment of FIG. 5 works best in an Orthogonal Transmit Diversity system. However, these embodiments are not restricted to just those antenna diversity schemes. In other words, the embodiment of FIG. 4 can operate in an Orthogonal Transmit Diversity system and the embodiment of FIG. 5 can operated in a Space Time Spreading system. Additionally, each embodiment will operate with any other type of transmit or receive antenna diversity scheme.

In summary, the processes and apparatuses of the present invention provide a mobile station with the ability to time track received signals in an area where the base stations transmit using antenna diversity. Depending on how a base station transmits the user data on multiple antennas, the mobile receiver can use either an average timing error, to track the timing offset, or independent error estimates from each demodulating element to independently time track the signals from each antenna.

What is claimed is:

1. A method for offset time tracking in a non-negligible multipath spacing environment encompassing an antenna diversity system, the antenna diversity system comprising a plurality of antennas each transmitting a modulated signal, the method comprising:
   demodulating each of the plurality of modulated signals based on a time offset, a plurality of data despreading sequences, and a plurality of pilot estimates, each signal having a different data despreading sequence of the plurality of data despreading sequences and a different pilot estimate of the plurality of pilot estimates;
   generating a plurality of time tracking error signals, one for each of the plurality of demodulated signals, in response to a pilot despreading sequence for each of the plurality of demodulated signals;
   generating an average time tracking error signal in response to the plurality of time tracking error signals; and
   generating an updated offset in response to the average time tracking error signal.

2. The method of claim 1, wherein the plurality of modululated signals are substantially similar.

3. The method of claim 1, wherein the time tracking error signals are generated from pilot signal samples performed a predetermined time prior to the time offset and a predetermined time subsequent to the time offset.

4. The method of claim 3, wherein the predetermined time prior to the time offset and the predetermined time subsequent to the time offset are substantially equal to one-half chip time.

5. The method of claim 1, further comprising combining the plurality of demodulated signals into a single data signal.

6. The method of claim 5, wherein the step of combining includes demultiplexing the plurality of demodulated signals.

7. The method of claim 1, wherein the updated offset is generated by a time tracking loop.

8. The method of claim 1, wherein the antenna diversity system is a receive antenna diversity system.

9. A method for offset time tracking in a non-negligible multipath spacing environment encompassing an antenna diversity system, the antenna diversity system comprising a plurality of antennas each transmitting a modulated signal, the method comprising:
   generating a first demodulated signal in response to a first modulated signal of the plurality of modulated signals, a first offset, a first data despreading sequence, and a first pilot estimate;
   generating a second demodulated signal in response to a second modulated signal of the plurality of modulated signals, the first offset, a second data despreading sequence, and a second pilot estimate;
   generating a first error signal for the first demodulated signal in response to a pilot signal sampling prior to the first offset, a pilot signal sampling subsequent to the first offset, and a first pilot despreading sequence;
   generating a second error signal for the second demodulated signal in response to a pilot signal sampling prior to the first offset, a pilot signal sampling subsequent to the first offset, and a second pilot despreading sequence;
   generating an average error signal in response to a weighted sum between the first and second error signals; and
   generating an updated offset in response to the average error signal.

10. The method of claim 9, further comprising combining the first demodulated signal and the second demodulated signal into a single data signal.

11. The method of claim 10, wherein the first and the second modulated signals are substantially similar.

12. The method of claim 10, wherein the first and the second modulated signals are alternating portions of a main data signal.

13. The method of claim 9, wherein the step of generating the updated offset comprises performing a time tracking process with a time tracking loop on average time error signal.

14. The method of claim 9, wherein the first error signal and the second error signal are weighted according to their respective energy levels such that the error signal having the lowest energy level receives the lowest weighting.

15. The method of claim 9, wherein the pilot signal sampling prior to the first offset and the pilot signal sampling subsequent to the first offset are performed at one-half chip time intervals prior to the first offset and subsequent to the first offset.

16. The method of claim 9, wherein the updated offset is used in demodulating further modulated signals received subsequent to the first modulated signal.

17. An offset time tracking apparatus that tracks a time offset in a non-negligible multipath spacing environment encompassing an antenna diversity system, the antenna diversity system comprising a plurality of antennas each transmitting a modulate signal, the apparatus comprising:
   a timing offset that provides an indication of the modulated signal location;
   a first demodulator, coupled to the timing offset, that generates a first demodulated signal in response to the timing offset and the modulated signal;
   a second demodulator, coupled to the timing offset, that generates a second demodulated signal in response to the offset and the modulated signal;
   means for generating a first energy magnitude error signal for the first demodulated signal, the means for generating coupled to the timing offset;

means for generating a second energy magnitude error signal for the second demodulated signal, the means for generating coupled to the timing offset;

means for generating an average energy magnitude error signal in response to the first and second error signals; and a time tracking loop, coupled to the means for generating an average energy magnitude error signal, that generates an updated offset in response to the average energy magnitude error signal.

18. The apparatus of claim 17, further comprising a radio frequency-to-baseband converter, coupled to both the first and second demodulators, for converting the modulated signal to a baseband frequency.

19. The apparatus of claim 17, further comprising means for weighting the first and the second energy magnitude error signals in response to their respective magnitudes.

20. In a mobile station receiver, a method for offset time tracking in a non-negligible multipath spacing environment encompassing an antenna diversity system, the antenna diversity system comprising a plurality of antennas each transmitting a modulated signal, the method comprising:

demodulating each of the plurality of signals based on a time offset, plurality of data despreading sequences, and a plurality of pilot estimates, each signal having a different data despreading sequence of the plurality of data despreading sequences and a different pilot estimate of the plurality of pilot estimates;

generating a plurality of time tracking error signals, one for each of the plurality of demodulated signals, in response to a pilot despreading sequence for each of the plurality of demodulated signals;

generating an average time tracking error signal in response to the plurality of time tracking error signals; and generating an updated offset in response to the average time tracking error signal.

21. A method for offset time tracking in a non-negligible multipath spacing environment encompassing an antenna diversity system, the antenna diversity system comprising a plurality of antennas each transmitting a modulated signal having an associated pilot signal, the method comprising:

demodulating a modulated signal of the plurality of modulated signal based on a time offset, a data despreading sequence, and a plurality of pilot estimates of an associated pilot signal;

generating an early time tracking error signal in response to a pilot despreading sequence for the associated pilot signal, an accumulation of the pilot signal over a predetermined interval, and a first plurality of sum signals that are generated in response to a symbol position in the associated pilot signal;

generating a late time tracking error signal in response to the pilot despreading sequence for the associated pilot signal, an accumulation of the pilot signal over the predetermined interval, and a second plurality of sum signals that are generated in response to the symbol position in the associated pilot signal;

generating an average time tracking error signal in response to the early and late time tracking error signals; and generating an updated offset in response to the average time tracking error signal.

* * * * *